United States Patent
Ihle et al.

(10) Patent No.: US 9,479,478 B2
(45) Date of Patent: Oct. 25, 2016

(54) METHOD FOR OPERATING A COMMUNICATION MODULE, AND COMMUNICATION MODULE

(71) Applicant: Robert Bosch GmbH, Stuttgart (DE)

(72) Inventors: Markus Ihle, Hemmingen (DE); Robert Szerwinski, Esslingen (DE); Juergen Likkei, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 33 days.

(21) Appl. No.: 14/281,311

(22) Filed: May 19, 2014

(65) Prior Publication Data
US 2014/0344916 A1    Nov. 20, 2014

(30) Foreign Application Priority Data

May 17, 2013   (DE) .......................... 10 2013 209 264

(51) Int. Cl.
*H04L 29/06*    (2006.01)

(52) U.S. Cl.
CPC ................................ *H04L 63/0227* (2013.01)

(58) Field of Classification Search
CPC .......... H04L 63/0227; H04L 63/0263; H04L 63/1408; H04L 63/1441
USPC .......................................................... 726/13
See application file for complete search history.

(56) References Cited

U.S. PATENT DOCUMENTS

2011/0176584 A1* 7/2011 Kikuchi .............. H04L 12/4633
375/211

FOREIGN PATENT DOCUMENTS

DE        02011077409        12/2012

* cited by examiner

*Primary Examiner* — Baotran N To
(74) *Attorney, Agent, or Firm* — Norton Rose Fulbright US LLP

(57) ABSTRACT

A method for operating a communication module of a network element of a communication network as well as the communication module itself are described. The communication module is embodied for the transmission of data. The network element has a communication module and an interface for communication with further network elements of the communication network. The communication module is embodied in such a way that the transmission, via the interface, of data for transmission is inhibited or authorized on the basis of a filter instruction.

29 Claims, 2 Drawing Sheets

METHOD FOR OPERATING A COMMUNICATION MODULE, AND COMMUNICATION MODULE

FIELD OF THE INVENTION

The present invention relates to a method for operating a communication module, and to a communication module.

BACKGROUND INFORMATION

A plurality of features, in the form of units connected to bus systems and/or software-based solutions, are known for enhancing the availability and security of bus systems in modern motor vehicles. The goal of these solutions is on the one hand to ensure communication between the network elements, and on the other hand to maintain the functionality of the network elements.

German Published Patent Appln. No. 10 2011 077 409 discloses a connection node for a communication network, which node is provided for connecting a network element and for connecting to the communication network. The connection node is embodied to read and/or modify and/or inhibit data exchanged between the communication network and the network element. The connection node is embodied, in particular, physically and/or electrically independently of the communication network and of the network element.

SUMMARY

The problem on which the invention is based is solved by a method for operating a communication module, and by a communication module.

According to the present invention the transmission, via an interface of a network element, of data for transmission is inhibited or authorized on the basis of a filter instruction. This filtering of outgoing data advantageously makes it possible for a malfunction on the part of the network element not to cause the further network elements of the communication network to be substantially impaired by said malfunction.

A malfunction of the network element can be triggered, for example, by a hardware fault or software fault, or by another unintended faulty system function. In particular, the malfunction of a network element lies outside a previously defined specification.

Malicious programs in the form of application software can be triggers for a malfunction. For example, a malfunction can be triggered by a so-called "Trojan" software program of a third party, the Trojan in the form of an application software program initially not being categorized as potentially malicious. At run time as well, components of the application software can be manipulated using corresponding techniques such as, for example, buffer overflow, and can result in a malfunction of the network element. This malfunction can result in the possibility of an unexpected communication pattern being triggered.

The approach according to the present invention contributes to reducing or entirely preventing the effects of the malfunction of a network element on the further network elements of the communication network. The network element thus substantially monitors itself via the communication module. In particular, a network element whose application software has been manipulated cannot be used to carry out attacks via the communication network on further network elements. The security and reliability of the communication network are thereby greatly enhanced.

In a further embodiment, in a startup mode of the network element and/or of the communication module the filter instruction is loaded from a nonvolatile memory into a memory region of a working memory of the communication module. The communication module is configured in such a way that in a normal mode following the startup mode, write access to the memory region in which the filter instruction is stored is inhibited. This advantageously ensures that the self-monitoring cannot be manipulated by malicious application software, since in the startup mode, in contrast to the normal mode, no application software that is associated with a layer of higher order than the system mode of the network element is yet being executed.

In a further advantageous embodiment, prior to the startup mode of the communication module and/or in the startup mode of the network element, but in particular before loading of the filter instruction into the memory region of the working memory of the communication module, that memory region is erased. This explicit erasure of the memory region for the filter instruction yields an additional safeguard with regard to manipulation attempts. Depending on the embodiment, for example, the working memory could be configured in such a way that, for example, it survives a software reset, so that the data stored in that memory region are retained. The explicit erasure results in increased security with regard to any manipulation attempts.

In an embodiment of the invention, the filter instruction encompasses one or more filter parameters. The filter parameter or one of the filter parameters is, for example, one or more target addresses to be detected and/or target address regions to be detected and/or a bit mask and/or a message identifier to be detected. The filter parameter is applied to the additional information accompanying the data for transmission. This advantageously creates the possibility of defining a communication pattern for the network element. In particular, the application software that is running on the network element can advantageously be limited in terms of its transmitting activity by a fixed communication pattern for outgoing data. This defined communication pattern results from one or more filter instructions, and is defined substantially independently of the specification of the application software and stored independently of the application software for access for the application via the communication module.

In an advantageous refinement, a data unit for transmission is detected by the communication module by way of a filter instruction, the filter instruction stipulating, by way of a further filter parameter, whether transmission of the detected data unit is inhibited or authorized. The advantageous result of this is that both positive and negative lists for data units detected on the basis of other filter parameters can be defined. Further degrees of freedom in defining filter instructions result therefrom.

Features important for the invention may also be found in the drawings below; even in the absence of further explicit instruction in that regard, the features can be important for the invention both in isolation and in different combinations.

DETAILED DESCRIPTION

Figure 1:
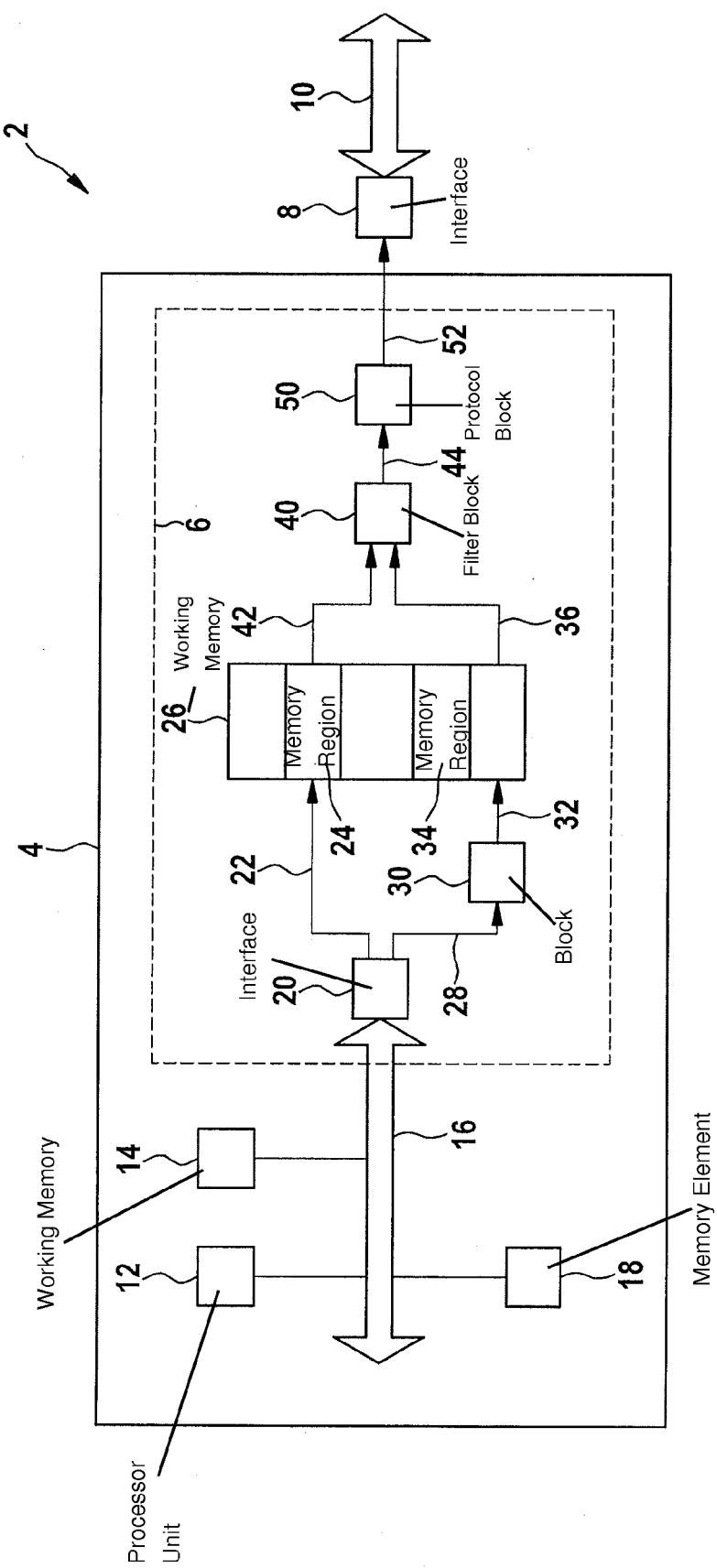
FIG. 1 is a schematic block diagram of a network element.

FIG. 1 shows a schematic block diagram 2 of a network element 4. Network element 4 encompasses a communication module 6. Communication module 6 of network element 4 also has associated with it an interface 8 through which communication is possible respectively with a communication network 10 and with a further network element of communication network 10. Communication module 6 of network element 4 is embodied in particular to transmit data to communication network 10 and also to receive it. FIG. 1 does not illustrate any elements that relate to the reception of data from communication network 10. Communication network 10 can, of course, also be embodied therefor. Communication network 10 encompasses further network elements.

The embodiment of network element 4 depicted in FIG. 1 is of course only an exemplifying embodiment. Alternatives to the embodiment depicted will be respectively explained below. In particular, the association of individual elements of network element 4 with communication module 6 can be embodied differently.

Network element 4 can be embodied in particular as a microcontroller, or can encompass a microcontroller, that encompasses a processor unit 12 and a working memory 14. The microcontroller furthermore encompasses a data bus 16 by way of which processor 12 can access working memory 14.

Network element 4 further encompasses a memory element 18 in which one or more filter instructions are stored. Memory element 18 is protected (in a manner not shown) from arbitrary overwriting by, for example, application software. Memory element 18 is also referred to as a "nonvolatile" memory. For example, memory element 18 can be protected, by a hardware security module (HSM) (not depicted), from a write access proceeding from data bus 16.

An interface 20 creates the connection between data bus 16 and communication module 6. In a normal mode of network element 4 and/or of communication module 6, processor 12 loads programs to be executed, or parts thereof, into working memory 14 in order to generate data that are provided for transmission to one or more further network elements of communication network 10. In normal mode the data for transmission, after storage in working memory 14, are conveyed to interface 20 which, as indicated by an arrow 22, deposits the data for transmission into a memory region 24 of a working memory 26 that is associated with communication module 6.

In a startup mode of communication module 6 and/or of network element 4, which is followed by the normal mode, at least one filter instruction is conveyed out of memory element 18 via interface 20 (indicated by arrow 28) to a block 30. Block 30 is embodied in such a way that in the startup mode of network element 4 or in the startup mode of communication module 6, it conveys or loads the at least one filter instruction (indicated by arrow 32) into a memory region 34 only once.

Immediately after the one-time writing of the at least one filter instruction out of memory element 18 into memory region 34 by block 30 in the startup mode, block 30 prevents write access to memory region 34 in particular in the normal mode that follows the startup mode.

Write access to memory region 34 in which the at least one filter instruction is stored is consequently inhibited. All write access queries that arrive at block 30 (indicated by arrow 28) are therefore blocked.

In an alternative embodiment, memory element 18 can be not connected to data bus 16 but instead associated with communication module 6, and associated, for example, with block 30 (indicated by arrow 28).

Before the startup mode and/or in the startup mode, but in particular before the at least one filter instruction is loaded into memory region 34 of working memory 26 of communication module 6, memory region 34 is erased by block 30.

Block 30 can be embodied as either hardware or software. Protection against further overwriting of memory region 34 of working memory 26 can be realized, for example, by a hardware-implemented function of setting a bit protected from further accesses, such that block 30 authorizes or inhibits write access as a function of the bit once it has been set.

Alternatively, the aforementioned function of block 30 can also be embodied as operating software for communication module 6, access being inhibited during the run time of the operating software of communication module 6, and access to the program code, which is stored in a memory and represents the operating software, being inhibited.

The startup mode of network element 4 is characterized in that after a hardware reset or software reset, or after an activation of network element 4, processor 12 is not yet executing any application software. In the normal mode that follows the startup mode, on the other hand, application software is executed by processor unit 12. Application software is notable for the fact that it does not make available the basic operating functions of network element 4 and/or of communication module 6, but instead relates to higher-order device functions. In the startup mode, only operating software, and not application software, is executed; in the startup mode the operating software categorically cannot be manipulated by application software, since no application software is executed in the startup mode.

The at least one filter instruction stored in memory region 34 is conveyed (indicated by an arrow 36) to a filter block 40. In filter block 40, the data for transmission are conveyed (indicated by an arrow 42) out of memory region 24 of working memory 26. Filter block 40 of communication module 6 is embodied in such a way that transmission of the data for transmission out of memory region 24 of working memory 26 via interface 8 is inhibited or authorized on the basis of the at least one filter instruction from memory region 34 of working memory 26. Memory regions 24 and 34 can of course be disposed in different working memories.

A filter instruction can encompass one or more filter parameters. A filter parameter can be, for example, one or more target addresses to be detected and/or target address regions to be detected and/or a bit mask and/or a message identifier to be detected.

Block 40 ensures that one or more filter parameters are applied to additional information accompanying a data unit for transmission. This additional information can be, for example, a CAN identity and/or an Ethernet address and/or a Flexray identity and/or an IP (internet protocol) address. In the case of a bit mask, the additional information is AND-combined with the bit mask. Multiple filter parameters can of course apply a filter instruction successively in time to the additional information item.

As a result of the application of at least one filter parameter to an additional information item, block 40 detects a specific data unit for transmission. This detected data unit for transmission is then inhibited or authorized for transmission on the basis of a further filter parameter, this further filter parameter stipulating either inhibition of the detected data unit or authorization for transmission of the detected data unit. If the result of applying a filter instruction to a data unit for transmission is that transmission is authorized, filter block 40 then conveys (indicated by an arrow 44) the data unit for transmission to a protocol block 50. Protocol block 50 provides (indicated by an arrow 52) for conveying the data for transmission to interface 8.

Figure 2:
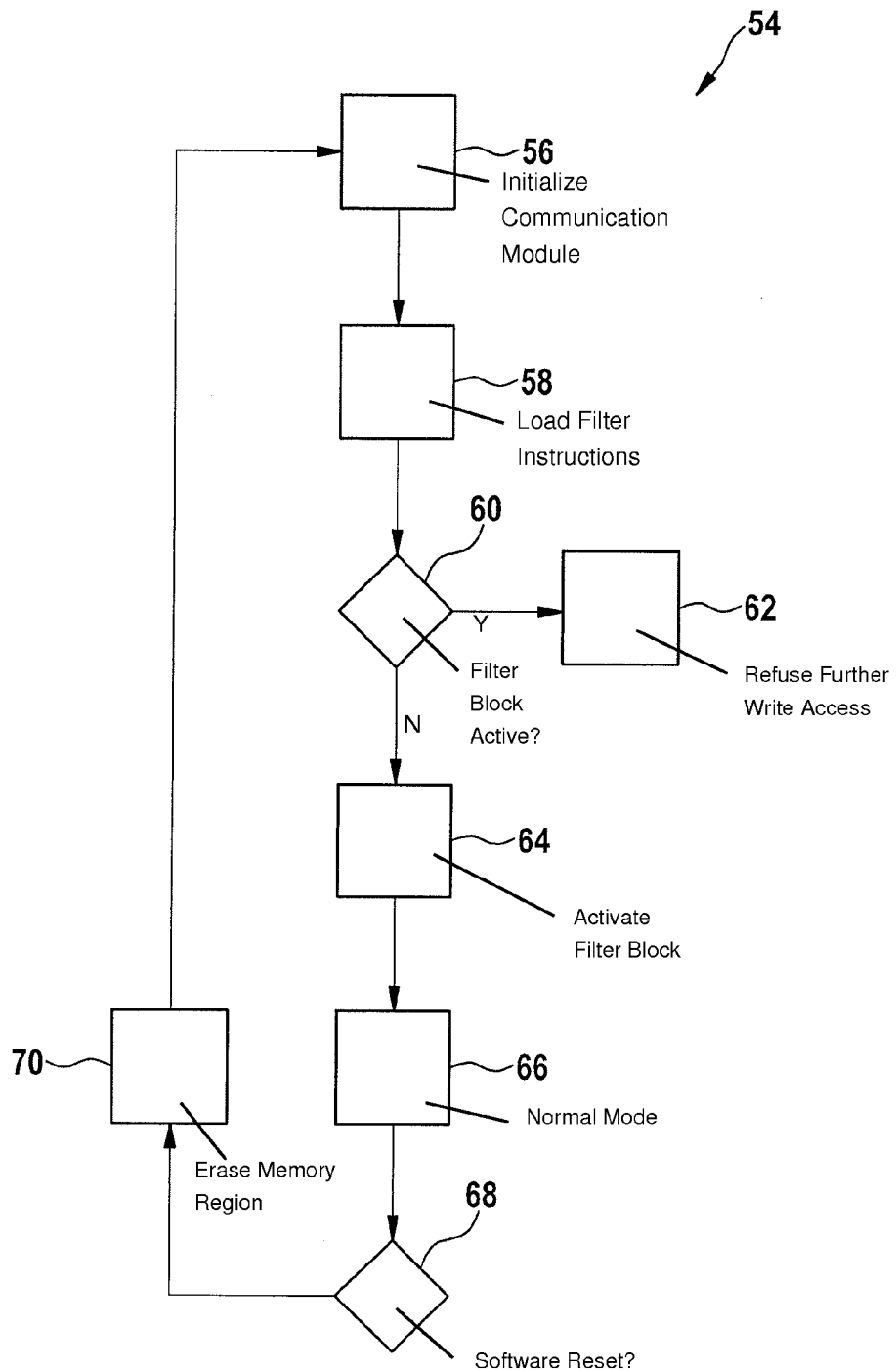
FIG. 2 is a schematic flow chart of a method for operating a communication module.

FIG. 2 shows a schematically depicted flow chart 54. According to a block 56, communication module 6 is initialized or started; this corresponds to the startup mode.

According to a block 58, the filter instructions are loaded into memory region 34. Block 58 is associated with the startup mode. In the startup mode, the filter instructions are read out of memory element 18 and loaded via block 30 into memory region 34. In one embodiment, the procedure according to block 56 can be implemented in hardware, so that block 30 loads the filter instructions out of memory element 18, by way of a direct access via data bus 16, into memory region 34 of working memory 26 of communication module 6. In another embodiment, this loading of the filter instructions can also be executed as software, according to block 30 in communication module 6. After loading of the filter instructions out of memory element 18, block 30 inhibits any further write access to memory region 34 of working memory 26.

According to query block 60, a query is made during the startup mode as to whether filter block 40 is already active. If filter block 40 is already active, then according to block 30 another write access to memory region 34 is refused, and the filter instructions already loaded in memory region 34 are retained. This function of refusing a further write access corresponds to a block 62 as shown.

If filter block 40 is not yet active, however, then according to a block 64 activation of filter block 40 occurs, the latter block carrying out the functions described with reference to FIG. 1. After successful activation of filter block 40 according to block 64, according to a block 66 operation transitions into the normal mode, so that filter block 40 blocks the data for transmission in accordance with the filter instruction, or releases them for transmission.

If a software reset query then occurs according to a block 68, block 30 then ensures, according to block 70 shown in FIG. 2, that memory region 34 of working memory 26 of communication module 6 is erased before a restart of communication module 6.

Alternatively or in addition to block 70, a further block (not shown) can be disposed according to block 70 between block 56 and block 58 in order to explicitly erase memory region 34 of working memory 26, for example, after a startup of communication module 6 triggered by a hardware reset or software reset. After a hardware reset, the process sequence shown in FIG. 2 begins at block 56. A hardware reset is associated with an at least brief interruption in current transmission, which results categorically in loss of the content of a volatile working memory. In the case of a software reset, conversely, a memory content of a volatile working memory can (depending on its embodiment) be retained.

An additional filter parameter of a filter instruction can stipulate that when block 40 has detected a data unit to be inhibited, communication module 6 or network element 4 carries out a further method step. This further method step can be, for example, a diagnostic function, in which context block 40 writes the detected inhibited data unit into a memory (not shown). Another further method step in this case can relate, for example, to a notification of further network elements, said notification preferably being implemented by communication module 6.

What is claimed is:

1. A method for operating a communication module of a network element of a communication network, the network element being embodied for a transmission of data, the method comprising:
    associating an interface for communication with further network elements of the communication network with the communication module, wherein the communication module is configured so that the transmission, via the interface, of data for transmission to one of the further network elements is one of inhibited and authorized based on a filter instruction; and
    in a startup mode of at least one of the network element and the communication module, loading the filter instruction from a nonvolatile memory into a memory region of a working memory of the communication module, wherein the communication module is configured so that in a normal mode of at least one of the network element and the communication module following the startup mode, write access to the memory region in which the filter instruction is stored is inhibited.

2. The method as recited in claim 1, further comprising: prior to the startup mode, erasing the memory region.

3. The method as recited in claim 2, wherein the memory region is erased before loading of the filter instruction into the memory region of the working memory of the communication module.

4. The method as recited in claim 1, wherein: the filter instruction encompasses at least one filter parameter, the at least one filter parameter including at least one of:
    at least one target address to be detected,
    at least one target address region to be detected, and
    at least one of a bit mask and a message identifier to be detected, and the at least one filter parameter is applied to additional information accompanying the data unit for transmission.

5. The method as recited in claim 4, wherein the additional information includes at least one of a CAN identity, a Flexray identity, an Ethernet address, and an IP address.

6. The method as recited in claim 4, further comprising: detecting a data unit for transmission by the communication module by the filter instruction, wherein the filter instruction stipulates, by a further filter parameter, whether transmission of the detected data unit is one of inhibited and authorized.

7. The method as recited in claim 1, wherein the nonvolatile memory for storing the filter instruction is configured so that overwriting by application software of the network element is not possible.

8. A non-transitory computer readable medium having a computer program, which is executable on a network element, comprising:
    a program code arrangement having program code for operating a communication module of a network element of a communication network, the network element being embodied for a transmission of data, by performing the following comprising:
    associating an interface, via the network element, for communication with further network elements of the communication network with the communication module, wherein the communication module is configured so that the transmission, via the interface, of data for transmission to one of the further network elements is one of inhibited and authorized based on a filter instruction; and
    in a startup mode of at least one of the network element and the communication module, loading the filter instruction from a nonvolatile memory into a memory region of a working memory of the communication module, wherein the communication module is configured so that in a normal mode of at least one of the network element and the communication module following the startup mode, write access to the memory region in which the filter instruction is stored is inhibited.

9. The non-transitory computer readable medium as recited in claim 8, wherein the network element is associated with the communication module.

10. The non-transitory computer readable medium as recited in claim 8, wherein prior to the startup mode, the memory region is erased.

11. The non-transitory computer readable medium as recited in claim 10, wherein the memory region is erased before loading of the filter instruction into the memory region of the working memory of the communication module.

12. The non-transitory computer readable medium as recited in claim 8, wherein: the filter instruction encompasses at least one filter parameter, the at least one filter parameter including at least one of:
- at least one target address to be detected,
- at least one target address region to be detected, and
- at least one of a bit mask and a message identifier to be detected, and the at least one filter parameter is applied to additional information accompanying the data unit for transmission.

13. The non-transitory computer readable medium as recited in claim 12, wherein the additional information includes at least one of a CAN identity, a Flexray identity, an Ethernet address, and an IP address.

14. The non-transitory computer readable medium as recited in claim 12, wherein a data unit for transmission by the communication module is detected by the filter instruction, wherein the filter instruction stipulates, by a further filter parameter, whether transmission of the detected data unit is one of inhibited and authorized.

15. The non-transitory computer readable medium as recited in claim 8, wherein the nonvolatile memory for storing the filter instruction is configured so that overwriting by application software of the network element is not possible.

16. A communication device for a network element of a communication network, comprising:
- a communication hardware component configured to transmit data from the network element, wherein an interface for communication with further network elements of the communication network is associated with the communication hardware component, and wherein the communication hardware component is configured so embodied in such a way that the transmission, via the interface, of data for transmission to one of the further network elements is one of inhibited and authorized based on a filter instruction;
- wherein in a startup mode of at least one of the network element and the communication hardware component the filter instruction is loaded from a nonvolatile memory into a memory region of a working memory of the communication hardware component, and wherein the communication hardware component is configured so that in a normal mode following the startup mode, write access to the memory region in which the filter instruction is stored is inhibited.

17. The communication device as recited in claim 16, wherein, prior to the startup mode, the memory region is erased.

18. The communication device as recited in claim 17, wherein the memory region is erased before loading of the filter instruction into the memory region of the working memory of the communication hardware component.

19. The communication device as recited in claim 16, wherein: the filter instruction encompasses at least one filter parameter, the at least one filter parameter including at least one of:
- at least one target address to be detected,
- at least one target address region to be detected, and
- at least one of a bit mask and a message identifier to be detected, and the at least one filter parameter is applied to additional information accompanying the data unit for transmission.

20. The communication device as recited in claim 19, wherein the additional information includes at least one of a CAN identity, a Flexray identity, an Ethernet address, and an IP address.

21. The communication device as recited in claim 19, wherein a data unit for transmission by the communication hardware component is detected by the filter instruction, wherein the filter instruction stipulates, by a further filter parameter, whether transmission of the detected data unit is one of inhibited and authorized.

22. The communication device as recited in claim 16, wherein the nonvolatile memory for storing the filter instruction is configured so that overwriting by application software of the network element is not possible.

23. A network device element, comprising:
- a communication hardware device for a network element of a communication network, the communication hardware device configured to transmit data from the network device element, wherein an interface for communication with further network elements of the communication network is associated with the communication hardware device;
- wherein the communication hardware device is configured so that the transmission, via the interface, of data for transmission to one of the further network elements is one of inhibited and authorized based on a filter instruction,
- wherein in a startup mode of at least one of the network device element and the communication hardware device the filter instruction is loaded from a nonvolatile memory into a memory region of a working memory of the communication hardware device, and wherein the communication hardware device is configured so that in a normal mode following the startup mode, write access to the memory region in which the filter instruction is stored is inhibited.

24. The network device element as recited in claim 23, wherein prior to the startup mode, the memory region is erased.

25. The network device element as recited in claim 24, wherein the memory region is erased before loading of the filter instruction into the memory region of the working memory of the communication hardware device.

26. The network device element as recited in claim 23, wherein: the filter instruction encompasses at least one filter parameter, the at least one filter parameter including at least one of:
- at least one target address to be detected,
- at least one target address region to be detected, and at least one of a bit mask and a message identifier to be detected, and the at least one filter parameter is applied to additional information accompanying the data unit for transmission.

27. The network device element as recited in claim 26, wherein the additional information includes at least one of a CAN identity, a Flexray identity, an Ethernet address, and an IP address.

28. The network device element as recited in claim 26, wherein a data unit for transmission by the communication hardware device is detected by the filter instruction, wherein the filter instruction stipulates, by a further filter parameter, whether transmission of the detected data unit is one of inhibited and authorized.

29. The network device element as recited in claim 23, wherein the nonvolatile memory for storing the filter instruction is configured so that overwriting by application software of the network element is not possible.

* * * * *